United States Patent
Popescu et al.

(10) Patent No.: US 9,221,545 B2
(45) Date of Patent: Dec. 29, 2015

(54) AIRCRAFT NACELLE ASSEMBLIES

(71) Applicant: The Boeing Company, Seal Beach, CA (US)

(72) Inventors: Alexandru Vlad Popescu, Kirkland, WA (US); Daniel Lynn Leger, Mill Creek, WA (US); Dean Leon Parham, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 13/856,284

(22) Filed: Apr. 3, 2013

(65) Prior Publication Data

US 2014/0301835 A1 Oct. 9, 2014

(51) Int. Cl.
*B64D 29/08* (2006.01)
*F01D 25/24* (2006.01)

(52) U.S. Cl.
CPC ............... *B64D 29/08* (2013.01); *F01D 25/24* (2013.01)

(58) Field of Classification Search
CPC ................................ B64D 29/06; B64D 29/08
USPC ................. 244/53 R, 53 B, 54; 415/126–128
See application file for complete search history.

(56) References Cited

U.S. PATENT DOCUMENTS

| | | | |
|---|---|---|---|
| 4,185,415 A | 1/1980 | LaConte | |
| 4,370,766 A | 2/1983 | Teague, Jr. | |
| 4,629,146 A * | 12/1986 | Lymons | 244/53 R |
| 4,913,396 A | 4/1990 | Dalebout et al. | |
| 4,933,032 A | 6/1990 | Kunert | |
| 5,046,689 A * | 9/1991 | Shine | 244/129.4 |
| 5,676,624 A | 10/1997 | Watterson et al. | |
| 5,704,569 A * | 1/1998 | Daniels | 244/129.5 |
| 5,836,564 A * | 11/1998 | Duran | 248/354.5 |
| 5,865,497 A | 2/1999 | Klein et al. | |
| 6,334,730 B1 * | 1/2002 | Porte | 403/104 |
| 6,869,046 B2 | 3/2005 | McEvoy | |
| 7,882,941 B2 * | 2/2011 | Rozema | 188/293 |
| 2003/0102405 A1* | 6/2003 | McEvoy | 244/54 |
| 2010/0024161 A1 | 2/2010 | Wood et al. | |
| 2010/0180432 A1 | 7/2010 | Payne et al. | |
| 2011/0038725 A1* | 2/2011 | Soulier et al. | 415/214.1 |
| 2011/0171019 A1* | 7/2011 | Provost | 415/214.1 |
| 2011/0173949 A1 | 7/2011 | Provost | |

FOREIGN PATENT DOCUMENTS

EP 0393259 A1 10/1990

* cited by examiner

*Primary Examiner* — Tien Dinh
*Assistant Examiner* — Alexander V Giczy
(74) *Attorney, Agent, or Firm* — DASCENZO Intellectual Property Law, P.C.

(57) ABSTRACT

Aircraft nacelle assemblies include a frame, a cowl coupled to the frame, and a biasing member (including a passive mechanism) coupled between the frame and the cowl. The cowl is configured to move between a closed position and an open position. The passive mechanism is configured to provide a biasing force to the cowl. When the cowl is in or near the closed position, the biasing force coupled with the weight of the cowl results in a first net force that urges the cowl away from the open position, and when the cowl is in or near the open position, the biasing force coupled with the weight of the cowl results in a second net force that urges the cowl away from the closed position.

19 Claims, 4 Drawing Sheets

AIRCRAFT NACELLE ASSEMBLIES

FIELD

The present disclosure relates to aircraft nacelles.

BACKGROUND

Large aircraft often include turbofan engines enclosed by nacelles. The nacelles comprise a number of rotatable cowls that provide access to the turbofan engines for maintenance. Manual operation of large and heavy cowls presents difficulty for maintenance personnel. Currently, large and heavy engine cowls are operated with the aid of electric or hydraulic powered actuators. Electric powered actuators are powered by an onboard or ground electric power source. Hydraulic powered actuators are powered by electric motor pumps or manually operated pumps, such as hand pumps. These types of systems are a source of added complexity, cost, and maintenance for the aircraft manufacturer and airline. Accordingly, there is a need for purely manually operated systems to facilitate operative opening of large and heavy cowls by maintenance personnel.

SUMMARY

Aircraft nacelle assemblies include a frame, a cowl that is rotatably and operatively coupled to the frame, and a biasing member operatively coupled between the frame and the cowl. The cowl is configured to move about a joint axis between a closed position, in which the cowl at least substantially covers an engine housed within the aircraft nacelle assembly, and an open position, in which the cowl at least substantially uncovers the engine. The biasing member is configured to provide a biasing force to the cowl. When the cowl is in or near the closed position, the biasing force coupled with the weight of the cowl results in a first net force that urges the cowl away from the open position, and when the cowl is in or near the open position, the biasing force coupled with the weight of the cowl results in a second net force that urges the cowl away from the closed position. In some embodiments, the biasing member assists in the manual opening of the cowl and the manually closing of the cowl. In some such embodiments, a force of less than about 80 lbs. is required to open and/or close the cowl.

DETAILED DESCRIPTION

Aircraft nacelle assemblies and associated methods are disclosed herein, with the aircraft nacelle assemblies being configured to facilitate manual opening and closing of the nacelle's cowls. More specifically, nacelle assemblies according to the present disclosure may be described as having a manual-assist mechanism that facilitates the manual opening and closing of a nacelle cowl, even when the nacelle cowl is heavy, such as in the range of 40-250 pounds (lbs.) (approximately 175-1,100 newtons (N). Accordingly, aircraft nacelle assemblies according to the present disclosure may facilitate engine maintenance, because a cowl is easier to operate with the included manual-assist mechanism than without it, such as just utilizing brute force to overcome the weight of the cowl.

Figure 1:
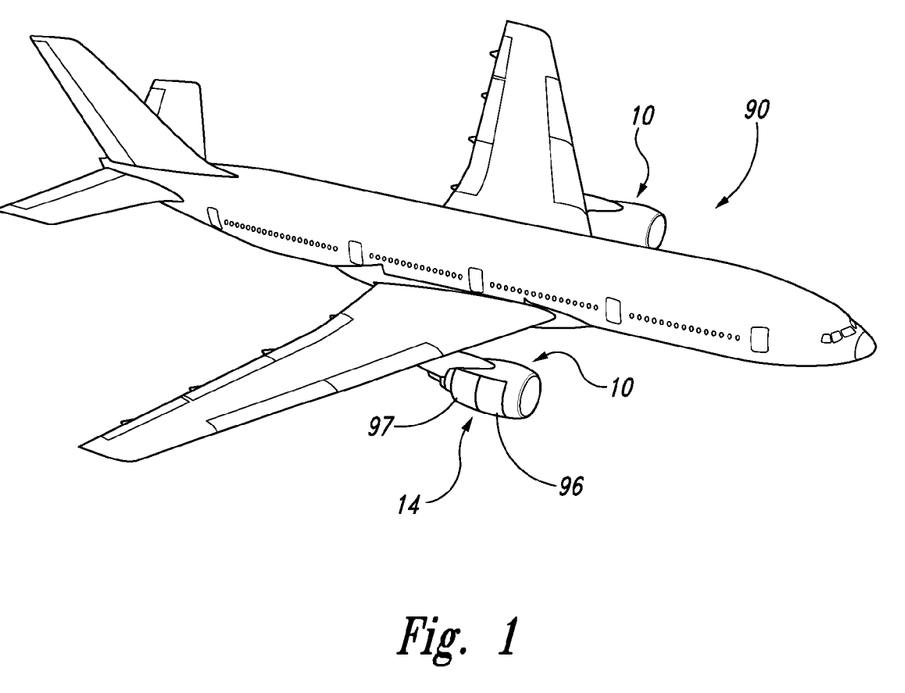
FIG. 1 is a perspective view of an illustrative, non-exclusive example of an aircraft.

In FIG. 1, an example aircraft 90 is illustrated; however, other types and configurations of aircraft are within the scope of the present disclosure. As schematically indicated in FIG. 1, aircraft 90 may include nacelle assemblies 10 associated with turbo-fan engines, with each nacelle assembly 10 typically including one or more cowls 14, such as one or more nacelle fan cowls 96 and optionally one or more other cowls 97, such as (but not limited to) nose cowls and/or thrust reverser cowls. A cowl may more generally be described as a rotatable member 14 and is operable to provide access to the engine housed within the nacelle, for example, for maintenance thereon.

Figure 2:
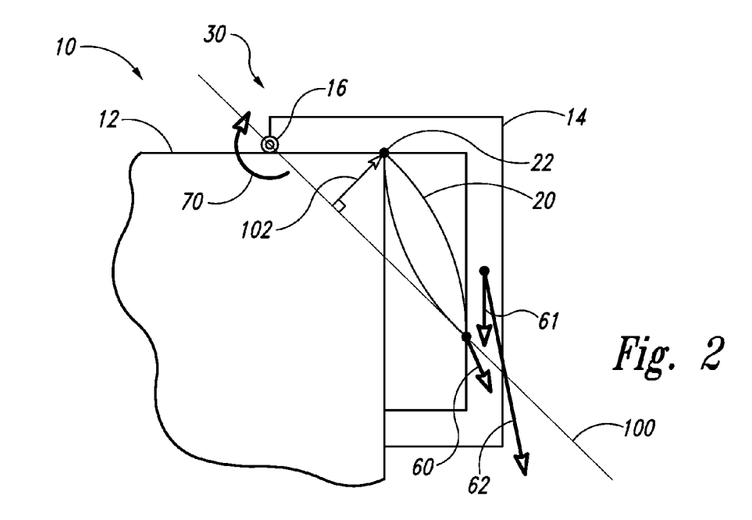
FIG. 2 is a schematic diagram representing examples of aircraft nacelle assemblies with a cowl in a closed position.
Figure 3:
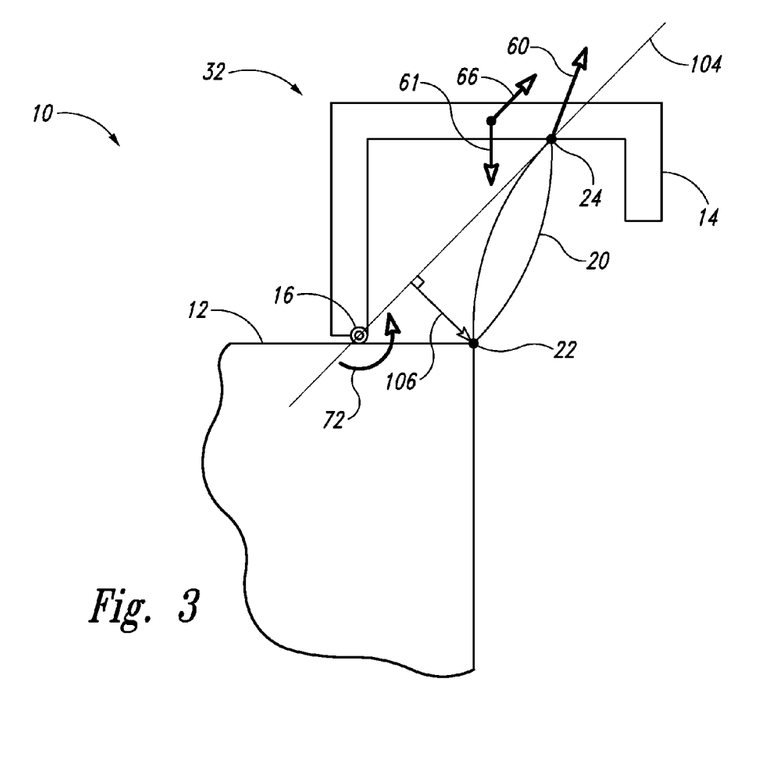
FIG. 3 is a schematic diagram representing examples of aircraft nacelle assemblies with a cowl in an open position.
Figure 4:
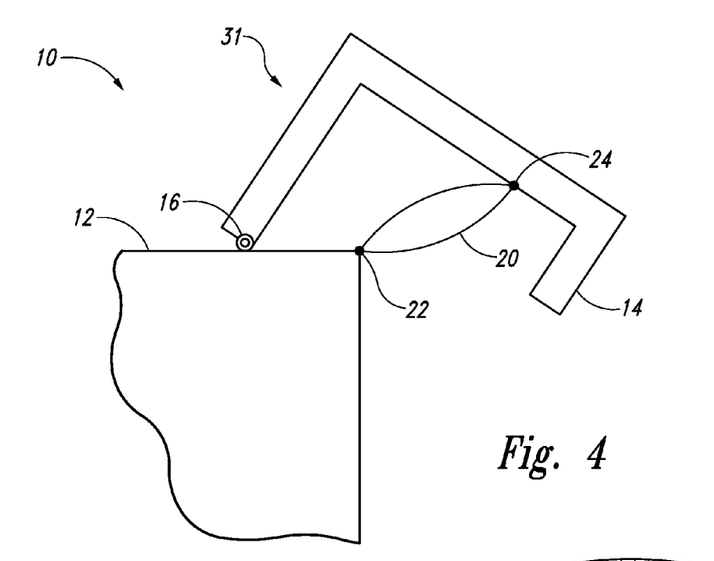
FIG. 4 is a schematic diagram representing examples of aircraft nacelle assemblies with a cowl in a neutral position.

FIGS. 2-4 are schematic representations of nacelle assemblies 10, cowls 14, and component parts thereof according to the present disclosure. While the present disclosure is generally directed to nacelle assemblies, other apparatuses that include rotatable members may incorporate similar structures and are considered to be within the scope of the present disclosure. Moreover, aircraft structures other than nacelles may incorporate rotatable members and associated structures according to the present disclosure, such as (but not limited to) nose cones, radomes, access panels, doors, etc.

As schematically illustrated in FIGS. 2-4, nacelle assemblies 10 include at least a frame 12, a cowl 14 operatively coupled to the frame through a rotatable joint 16, and at least one biasing member 20 operatively coupled to the frame at a first coupling 22 and to the cowl at a second coupling 24. The cowl is configured to move about the rotatable joint in a range of positions, including a closed position 30 and an open position 32. FIG. 2 schematically illustrates the cowl in the closed position, FIG. 3 schematically illustrates the cowl in the open position, and FIG. 4 schematically illustrates the cowl in a neutral position 31 between the open position and the closed position, as discussed in more detail herein. As schematically illustrated, the biasing member 20 is housed within the nacelle assembly when the cowl is in the closed position. When the cowl is in the closed position, the cowl is generally in the proximity of the frame 12, defining an outer aero-surface of the nacelle assembly, and access to the engine is restricted. On the other hand, in the open position, the cowl is pivoted away from the frame, permitting access to the engine.

In nacelle assemblies 10, the frame 12 represents any suitable structure or structures of the nacelle assembly to which the cowl may be operably and rotatably coupled and to which the biasing member, or members, 20 may be operably coupled, including (but not limited to) cowl support structure, turbo fan structure, air frame structure, engine support structure, engine structure, pylon strut structure, fan case structure, etc. When the cowl is opened by an operator, the frame is stationary, and the cowl and the biasing member move relative to the frame. Additionally or alternatively, the frame may be described as the body, or base, of the nacelle assembly and/or associated power plant, or engine, while the cowl represents an access door that is configured to provide selective access to an interior of the nacelle assembly. That is, as used herein, a nacelle assembly may include more than just a nacelle, for example, additionally including portions of the engine or related structure, to which the biasing member is operatively coupled.

The arrangement of the rotatable joint 16, the first coupling 22, and the second coupling 24 is configured to produce forces and/or torques on the cowl to assist motion of the cowl to the closed position 30 and to the open position 32, with these forces and torques schematically represented in FIGS. 2-3. When the cowl is in or near the closed position, a first net force 62 on the cowl urges the cowl away from the open position 32 and/or toward the closed position. When the cowl is in or near the open position, a second net force 66 on the cowl urges the cowl away from the closed position 30 and/or toward the open position. These net forces are a combination of a weight 61 of the cowl and a biasing force 60 imparted by the biasing member 20 to the cowl, and in FIGS. 2-3 are schematically represented at a theoretical center of mass of the cowl for purposes of illustration. When the cowl is in or near the closed position 30, the first net force 62 and the resulting first net torque 70 about the rotatable joint 16 may be described as being directed away from the open position 32 and/or as urging the cowl away from the open position and/or toward the closed position, thereby assisting the closing of the cowl. When the cowl is in or near the open position 32, the second net force 66 and the resulting second net torque 72 may be described as being directed away from the closed position 30 and/or as urging the cowl away from the closed position and/or toward the open position, thereby assisting the opening of the cowl by a user. When the cowl is in the neutral position 31, which is between the closed position 30 and the open position 32, the net torque on the cowl about the rotatable joint 16 axis is zero. Accordingly, the net torque on the cowl in the neutral position neither urges the cowl toward the open position nor urges the cowl toward the closed position. This neutral position additionally or alternatively may be described as a crossover position, because as the cowl passes from one side of the neutral position to the other side of the neutral position, the net torque changes direction. In the schematic illustrations of FIGS. 2-4, the net torque changes from a clockwise direction to a counter-clockwise direction as the cowl passes through the neutral position 31 from the closed position to the open position.

The rotatable joint 16, about which the cowl is configured to operably rotate, may be and/or include any mechanism, device, or configuration that allows the cowl to rotate relative to the frame. Rotatable joints include those where the cowl is coupled through a fixed axis. Illustrative, non-exclusive examples of rotatable joints include hinges, rotary joints, articulated joints, pinned joints, and ball joints.

The rotatable joint 16 allows the cowl 14 to rotate relative to the frame 12 about a joint axis. As discussed, the cowl 14 is configured to move or rotate about the joint axis between at least two distinct positions, the closed position 30 and the open position 32. The cowl may be configured to not move beyond the closed position and/or the open position. For example, if both the closed position and the open position are limits of motion, the cowl is restricted to move only between the closed position and the open position.

As discussed, nacelle assemblies 10 include at least one biasing member 20. Each biasing member 20 is configured to apply a biasing force 60 to the cowl 14, generally performing work on the cowl as the cowl changes positions, such as between the closed position 30 and the open position 32. Nacelle assemblies 10 are configured such that the forces to operatively open and close the cowl 14 are supplied by the biasing member 20, an operator, and gravity.

In some embodiments, the first net force 62 results in a stable equilibrium at the closed position 30. The stable equilibrium may result from configuring the biasing member to yield a net force upon the cowl that is directed toward the closed position when the cowl is near the closed position. Additionally or alternatively, the closed position may be at a limit of motion of the cowl. Thus, a stable equilibrium is established because a force away from the open position urges the cowl toward the closed position, and the limit of its motion.

In some embodiments, the second net force 66 results in a stable equilibrium at the open position 32. The stable equilibrium may result from configuring the biasing member to yield a net force upon the cowl that is directed toward the open position when the cowl is near the open position. Additionally or alternatively, the open position may be at a limit of motion of the cowl. Thus, a stable equilibrium is established because a force away from the closed position urges the cowl toward the open position, and the limit of its motion.

Additionally or alternatively, nacelle assemblies 10 may be described in terms of the arrangement of the positions of the rotatable joint 16, the first coupling 22, and the second coupling 24. Generally, the first coupling 22 and the second coupling 24 are both spaced away from the rotatable joint 16. The line from the rotatable joint 16 to the second coupling 24 when the cowl 14 is in the closed position 30 is denoted herein as the first position line 100 and is schematically presented in FIG. 2. The line from the rotatable joint 16 to the second coupling 24 when the cowl 14 is in the open position 32 is denoted herein as the second position line 104 and is schematically presented in FIG. 3. In some embodiments, the first coupling 22 may be arranged to be on the opposite sides of the first position line 100 and the second position line 104 depending on whether the cowl is in the closed position or the open position. That is, as seen in FIG. 2, the first coupling 22 is positioned above the first position line 100 when the cowl is in the closed position, and as seen in FIG. 3, the second coupling 22 is positioned below the second position line 104 when the cowl is in the open position. Such an arrangement facilitates the biasing member imparting a biasing force 60 so that the cowl is biased toward the closed position when on the closed side of the neutral position and toward the open position when on the open side of the neutral position. Stated differently, in this arrangement, the displacement of the first coupling 22 from the first position line 100, denoted the first displacement 102 in FIG. 2, has the opposite sign of the displacement of the first coupling 22 from the second position line 104, denoted the second displacement 106 in FIG. 3. As used herein, displacement of a point from a line is a vector quantity that describes the minimum distance and direction from the line to the point.

The biasing member 20 may be configured to apply a biasing force 60 throughout the range of motion of the cowl 14 or only at a subset of the range of motion, so long as the biasing member 14 applies a biasing force at or near the closed position 30 and a biasing force at or near the open position 32. The nacelle 10 may be configured such that a force of a substantially constant magnitude is required to move the cowl between the closed position and the open position, or some subset of the range of motion of the cowl. In some embodiments, the force required to move the cowl from the closed position to the open position and/or from the open position to the closed position is low enough to facilitate manual manipulation of the cowl by an operator, for example, a force of less than about 80 lbs. (approximately 356 N). Additionally or alternatively, some nacelle assemblies may be described as being configured to permit manual opening and closing of a cowl, for example, without the aid of an electric or hydraulic powered actuator.

In some embodiments, the weight of the cowl in the open position is significantly supported by the biasing member, at least when the joint axis associated with the rotatable joint 16 is substantially horizontal, inclined from vertical, or substantially non-vertical. The biasing force 60 may significantly counteract the weight of the cowl when it is in the open position. Additionally or alternatively, the biasing member may support substantially all the weight of the cowl when it is in the open position.

The first coupling 22 and the second coupling 24 may couple the biasing member 20 with a rotatable coupling. Rotatable couplings may include such couplings as hinges, rotary joints, articulated joints, pinned joints, and ball joints.

Nacelle assemblies 10 may include more than one biasing member 20 associated with a single cowl 14. A plurality of biasing members may be useful to reduce the force required of each individual biasing member, to distribute the force applied to the cowl, and/or to provide redundancy in case one of the biasing members fails. When present, the plurality of biasing members may be configured to apply substantially equal forces to the cowl in the closed position, the open position, and/or as the cowl transits between the closed position and the open position. Additionally or alternatively, the plurality of biasing members may be configured to apply substantially unequal forces to the cowl in the closed position, the open position, and/or as the cowl transits between the closed position and the open position. Each biasing member may be configured to apply a force to the cowl in the closed position, the open position, and/or as the cowl transits between the closed position and the open position.

Figure 5:
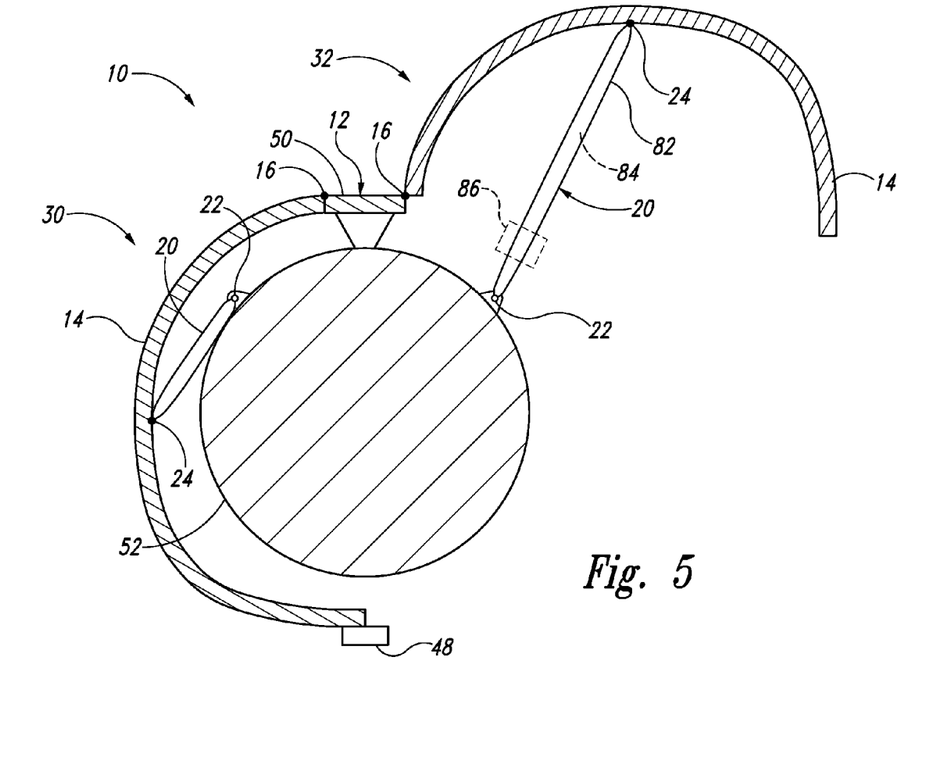
FIG. 5 is a schematic diagram representing illustrative, non-exclusive examples of aircraft nacelle assemblies.

Turning now to FIG. 5, a somewhat less schematic representation of a nacelle assembly 10 according to the present disclosure is presented, with a cowl 14 in an open position 32 and a cowl 14 in a closed position. As illustrated, the frame 12 may include distinct structure that is spaced part from each other and to which the cowls and biasing members are separately attached. Accordingly, the frame 12 may be described as including a cowl support 50 and a biasing member support 52 that is spaced inward from the cowl support. As an illustrative, non-exclusive example, the cowl support may correspond to a fan cowl support beam, and the biasing member support correspond to an engine support or other structure that is internal of the nacelle assembly. Other configurations also are within the scope of the present disclosure.

In some embodiments, the nacelle assembly 10 may be configured to at least temporarily affix the cowls 14 in their closed positions 30 and/or in their open positions 32. Thus, the cowls may be at least temporarily secured from rotation. For example, as schematically illustrated in FIG. 5, the cowls 14 may be affixed in the closed position by a fastening mechanism 48 that is configured to selectively and at least temporarily retain the cowls in the closed position. Illustrative, non-exclusive examples of fastening mechanisms include latches, clasps, pins, and ties. Additionally or alternatively, the biasing member 20 may include a locking mechanism 86 that is configured to selectively and at least temporarily fix the length of the biasing member. Accordingly, when the locking mechanism is actuated, or otherwise configured to restrict the increase or decrease in length of the biasing member, the cowl may be restricted from rotating relative to the frame. When present, the locking mechanism may facilitate selective locking of the cowl in the open position, with such an optional configuration being desirable, for example, so that a gust of wind does not cause the cowl to close on an operator.

As schematically illustrated in FIG. 5, biasing members 20 may include a biasing mechanism 84 among other components. Additionally or alternatively, a biasing member 20 may include a biasing mechanism 84 that supplies the biasing force of the biasing member. The biasing mechanism is typically a passive mechanism or a mechanical energy storage mechanism, such as a spring. Illustrative, non-exclusive examples of compatible springs include compression springs, extension springs, torsion springs, coil springs, helical springs, flat springs, oleo pneumatic springs, elastomeric springs, and gas springs. As another example, the biasing mechanism may be a gas-tight ram including a cylinder containing the gas and a piston.

The biasing mechanism may be under compression at any position of a corresponding cowl. In some embodiments, the biasing mechanism may always be in compression, including when a cowl is in the closed position, in the open position, and all positions between the closed position and the open position, including the neutral position.

In some embodiments, a biasing member 20 also may include a biasing member cover 82, with the biasing member cover serving to at least partially enclose any biasing mechanism 84. Such a biasing member cover may facilitate maintenance of the biasing member, may contain biasing mechanism components, and/or may promote operator safety, such as by reducing hazard from the operation of the biasing mechanism or reducing hazard from failure of the biasing mechanism. The biasing member cover may be rigid, flexible, or extensible. For example, if the biasing mechanism is a coil spring, the biasing member cover may be a telescoping cover enclosing the spring, capable of withstanding the forces encountered if the spring ever breaks.

Figure 6:
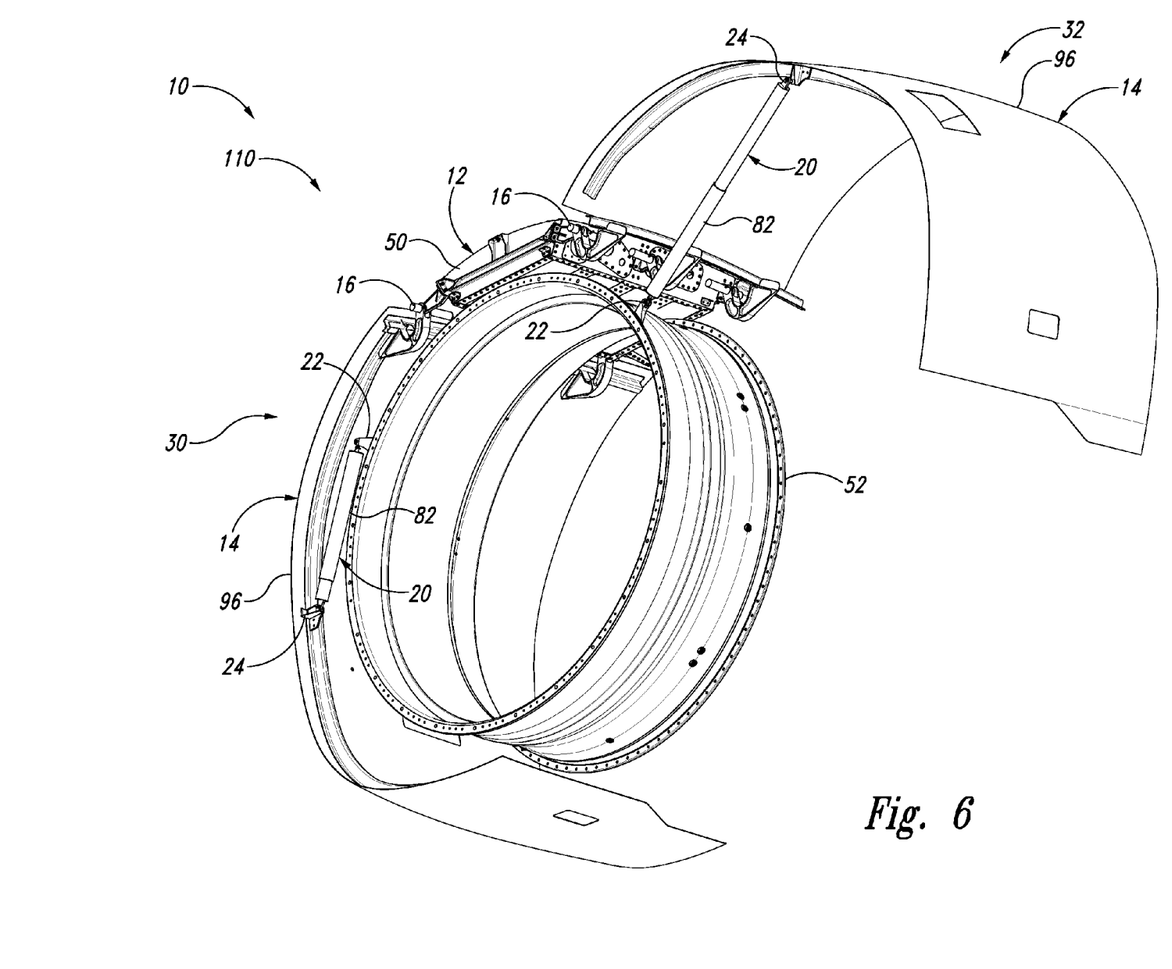
FIG. 6 is an isometric view of an illustrative, non-exclusive example of an aircraft nacelle assembly.

Turning now to FIG. 6, an illustrative non-exclusive example of a nacelle assembly 10 according to the present disclosure is illustrated and indicated generally at 110. Where appropriate, the reference numerals from the schematic illustrations of FIGS. 2-5 are used to designate corresponding parts of nacelle assembly 110; however, the example of FIG. 6 is non-exclusive and does not limit nacelle assemblies 10 to the illustrated embodiment of nacelle assembly 110. That is, nacelle assemblies according to the present disclosure are not limited to the specific embodiments of the illustrated nacelle assembly 110, and nacelle assemblies 10 may incorporate any number of the various aspects, configurations, characteristics, properties, etc. of nacelle assemblies 10 that are illustrated in and discussed with reference to the schematic representations of FIGS. 2-5 and/or the embodiment of FIG. 6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to nacelle assembly 110; however, it is within the scope of the present disclosure that the previously discussed features, variants, etc. may be utilized with nacelle assembly 110.

Nacelle assembly 110 includes two cowls 14 in the form of fan cowls 96, a frame 12 that includes a cowl support 50 and a biasing member support 52 corresponding to fan case structure, and one biasing member 20 corresponding to each fan cowl. In FIG. 6, the fan cowl illustrated on the right is in an open position 32, and the fan cowl illustrated on the left is in a closed position 30.

The biasing members 20 of nacelle assembly 110 each include a telescoping cover 82 with a locking mechanism 86 that is configured to permit for selective locking of the biasing members in a fixed length, such as when a fan cowl is in its open position.

Illustrative, non-exclusive examples of inventive subject matter according to the present disclosure are described in the following enumerated paragraphs:

A1. An apparatus, comprising:

a frame;

a rotatable member rotatably operatively coupled to the frame through a rotatable joint, wherein the rotatable member is configured to rotate about a joint axis between a first position and a second position, and wherein the rotatable member has a weight; and at least one biasing member operatively coupled between the frame and the rotatable member and configured to apply a biasing force to the rotatable member, wherein when the rotatable member is in or near the first position, the biasing force coupled with the weight of the rotatable member results in a first net force that urges the rotatable member away from the second position, and wherein when the rotatable member is in or near the second position, the biasing force coupled with the weight of the rotatable member results in a second net force that urges the cowl away from the first position.

A2. The apparatus of paragraph A1, wherein the first position is a closed position, in which the rotatable member at least substantially covers an opening, and wherein the second position is an open position, in which the rotatable member at least substantially uncovers the opening.

A3. The apparatus of paragraphs A1-A2, wherein the apparatus includes an aircraft nacelle assembly, and wherein the rotatable member includes a cowl.

A4. The apparatus of any of paragraphs A1-A3, wherein the rotatable member weighs in the range of 40-250 lbs. (or in the range of 175-1,100 N).

A5. The apparatus of any of paragraphs A1-A4, wherein the rotatable member is operatively coupled to the frame with a hinge, a rotary joint, an articulated joint, a pinned joint, or a ball joint.

A6. The apparatus of any of paragraphs A1-A5, wherein the rotatable member is configured to rotate about the joint axis at least 30°, 45°, 60°, 90°, 150°, or 180° between the first position and the second position.

A7. The apparatus of any of paragraphs A1-A6, wherein the rotatable member is configured to rotate about the joint axis less than 30°, 45°, 60°, 90°, 150°, or 180° between the first position and the second position.

A8. The apparatus of any of paragraphs A1-A7, wherein the rotatable member is configured to be moved manually to the first position from the second position and/or to the second position from the first position with a force that is less than 80 lbs. (or that is less than 356 N).

A9. The apparatus of any of paragraphs A1-A8, wherein the first net force causes a first net torque on the rotatable member about the joint axis that urges the rotatable member away from the second position, and wherein the second net force causes a second net torque on the rotatable member about the joint axis that urges the rotatable member away from the first position.

A10. The apparatus of any of paragraphs A1-A9, wherein the joint axis is substantially horizontal when the apparatus is in a predetermined position, optionally wherein the predetermined position is associated with maintenance, repair, or operation of the apparatus.

A11. The apparatus of any of paragraphs A1-A10, wherein the at least one biasing member supports a portion of the weight of the rotatable member when the rotatable member is in the second position.

A11.1 The apparatus of paragraph A11, wherein the at least one biasing member supports substantially all the weight of the rotatable member when the rotatable member is in the second position.

A12. The apparatus of any of paragraphs A1-A11.1, wherein the at least one biasing member does not utilize electric or hydraulic powered actuators.

A13. The apparatus of any of paragraphs A1-A12, wherein the at least one biasing member includes a biasing mechanism.

A13.1 The apparatus of paragraph A13, wherein the biasing mechanism is a passive mechanism or a mechanical energy storage mechanism.

A14. The apparatus of any of paragraphs A1-A13, wherein the biasing member includes a spring.

A15. The apparatus of any of paragraphs A1-A14, wherein the at least one biasing member is under compression at the first position and/or at the second position.

A16. The apparatus of any of paragraphs A1-A15, wherein the at least one biasing member is under compression during a full extent of movement of the rotatable member between the first position and the section position.

A17. The apparatus of any of paragraphs A1-A16, wherein the at least one biasing member includes a biasing member cover, and optionally a telescoping cover.

A17.1 The apparatus of paragraph A17 when depending from paragraph A14, wherein the biasing member cover is configured to contain the spring if and/or when the spring fails.

A18. The apparatus of any of paragraphs A1-A17.1, wherein the at least one biasing member has a variable length.

A19. The apparatus of any of paragraphs A1-A18, wherein the at least one biasing member is operatively coupled to the frame with a first coupling and is operatively coupled to the rotatable member with a second coupling, wherein a displacement of the first coupling from a line from the rotatable joint to the second coupling when the rotatable member is in the first position is a first position displacement, wherein a displacement of the first coupling from a line from the rotatable joint to the second coupling when the rotatable member is in the second position is a second position displacement, and wherein the first position displacement and the second position displacement have opposite signs.

A20. The apparatus of any of paragraphs A1-A19, wherein the at least one biasing member is operatively coupled to the rotatable member via a hinge, a rotary joint, an articulated joint, a pinned joint, or a ball joint.

A21. The apparatus of any of paragraphs A1-A20, wherein the at least one biasing member is operatively coupled to the frame via a hinge, a rotary joint, an articulated joint, a pinned joint, or a ball joint.

A22. The apparatus of any of paragraphs A1-A21, wherein the at least one biasing member includes two or more biasing members.

A23. The apparatus of any of paragraphs A1-A22, wherein each biasing member applies a substantially equal force to the rotatable member when the rotatable member is in the first position.

A24. The apparatus of any of paragraphs A1-A23, wherein each biasing member applies a substantially equal force to the rotatable member when the rotatable member is in the second position.

A25. The apparatus of any of paragraphs A1-A24, wherein each biasing member applies a substantially equal force to the rotatable member as the rotatable member transits between the first position and the second position.

A26. The apparatus of any of paragraphs A1-A25, wherein each biasing member is configured to apply a force to the rotatable member as the rotatable member transits between the first position and the second position.

A27. The apparatus of any of paragraphs A1-A26, wherein the rotatable member is configured to be at least temporarily affixed in one or both of the first position and the second position.

A28. The apparatus of any of paragraphs A1-A27, further comprising:

a fastening mechanism configured to at least temporarily affix the rotatable member to the frame in the first position, optionally wherein the fastening mechanism includes a latch, a clasp, a pin, or a tie.

A29. The apparatus of any of paragraphs A1-A28, wherein the biasing member includes a locking mechanism that is configured to selectively and temporarily fix a length of the biasing member so that the rotatable member is restricted from moving about the joint axis.

A30. The apparatus of any of paragraphs A1-A29, wherein the frame includes an outer frame and an inner frame that is spaced inward from the outer frame, and optionally wherein the at least one biasing member is operatively coupled to inner frame.

A31. The apparatus of any of paragraphs A1-A30, wherein the rotatable member is further configured to rotate to a neutral position between the closed position and the open position, and wherein when the rotatable member is in the neutral position, the biasing force coupled with the weight of the rotatable member results in a net torque on the rotatable member about the joint axis that neither urges the rotatable member away from the first position nor urges the rotatable member away from the second position.

A32. The apparatus of any of paragraphs A1-A31, wherein the apparatus facilitates rotation of the rotatable member by an operator grasping and manipulating a region of the rotatable member that is distal to the joint axis.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft nacelle assembly, comprising:
a frame;
a cowl rotatably and operatively coupled to the frame with a rotatable joint, wherein the cowl is configured to rotate about a joint axis between a closed position and an open position, wherein in the closed position the cowl at least substantially covers an engine housed within the aircraft nacelle assembly, wherein in the open position the cowl at least substantially uncovers the engine, and wherein the cowl has a weight; and
a biasing member operatively coupled between the frame and the cowl, wherein the biasing member includes a passive mechanism configured to apply a biasing force to the cowl, wherein the biasing member is operatively coupled to the frame with a first coupling and is operatively coupled to the cowl with a second coupling, wherein the first coupling is above a first line from the rotatable joint to the second coupling when the cowl is in the closed position, and wherein the first coupling is below a second line from the rotatable joint to the second coupling when the cowl is in the open position, wherein when the cowl is in or near the closed position, the biasing force coupled with the weight of the cowl results in a first net force that urges the cowl away from the open position, and wherein when the cowl is in or near the open position, the biasing force coupled with the weight of the cowl results in a second net force that urges the cowl away from the closed position.

2. The aircraft nacelle assembly of claim 1, wherein the frame includes a cowl support and a fan case that is spaced inward from the cowl support, wherein the cowl is rotatably and operably coupled to the cowl support, and wherein the biasing member is operatively coupled between the cowl and the fan case.

3. The aircraft nacelle assembly of claim 1, wherein the first net force causes a first net torque on the cowl about the joint axis that urges the cowl away from the open position, and wherein the second net force causes a second net torque on the cowl about the joint axis that urges the cowl away from the closed position.

4. The aircraft nacelle assembly of claim 1, wherein the cowl in the closed position encloses the biasing member within the aircraft nacelle assembly.

5. The aircraft nacelle assembly of claim 1, wherein the joint axis is substantially horizontal when the aircraft nacelle assembly is in a predetermined position associated with maintenance of an associated engine housed within the aircraft nacelle assembly.

6. The aircraft nacelle assembly of claim 1, wherein the cowl is configured to be moved manually to the open position from the closed position with a force that is less than 80 lbs.

7. The aircraft nacelle assembly of claim 1, wherein the biasing member includes a telescoping cover enclosing the passive mechanism.

8. The aircraft nacelle assembly of claim 1, wherein the biasing member includes a locking mechanism that is configured to selectively and temporarily fix a length of the biasing member so that the cowl is temporarily restricted from moving about the joint axis.

9. The aircraft nacelle assembly of claim 1, wherein the biasing member does not utilize electric or hydraulic powered actuators.

10. The aircraft nacelle assembly of claim 1, wherein the cowl is further configured to move to a neutral position that is between the closed position and the open position, and wherein when the cowl is in the neutral position, the biasing force coupled with the weight of the cowl results in a net torque on the cowl about the joint axis that is neither away from the open position nor away from the closed position.

11. The aircraft nacelle assembly of claim 1, wherein the biasing member is under compression during a full extent of movement of the cowl between the closed position and the open position.

12. The aircraft nacelle assembly of claim 1, wherein the aircraft nacelle assembly includes two or more biasing members, wherein each biasing member applies a substantially equal force to the cowl when the cowl is in the closed position, and wherein each biasing member applies a substantially equal force to the cowl when the cowl is in the open position.

13. The aircraft nacelle assembly of claim 1, wherein the rotatable joint is a hinge.

14. An aircraft nacelle assembly, comprising:
a cowl support;
a fan case;
a cowl rotatably and operatively coupled to the cowl support with a rotatable joint, wherein the cowl is configured to rotate about a joint axis between a closed position, a neutral position, and an open position, wherein in the closed position the cowl substantially covers an engine housed within the aircraft nacelle assembly, wherein in the neutral position the cowl partially uncovers the engine, wherein in the open position the cowl at least substantially uncovers the engine, and wherein the cowl has a weight; and
a biasing member operatively coupled between the fan case and the cowl, wherein the biasing member includes a spring configured to apply a biasing force to the cowl, wherein the biasing member is operatively coupled to the fan case with a first coupling and is operatively coupled to the cowl with a second coupling, wherein the first coupling is above a first line from the rotatable joint to the second coupling when the cowl is in the closed position, and wherein the first coupling is below a second line from the rotatable joint to the second coupling when the cowl is in the open position;
wherein when the cowl is in or near the closed position, the biasing force coupled with the weight of the cowl results in a first net torque on the cowl about the joint axis that urges the cowl away from the open position, wherein when the cowl is in or near the open position, the biasing force coupled with the weight of the cowl results in a second net torque on the cowl about the joint axis that urges the cowl away from the closed position, wherein when the cowl is in the neutral position, the biasing force coupled with the weight of the cowl results in a third net torque on the cowl about the joint axis that neither urges the cowl away from the open position nor urges the cowl away from the closed position, wherein the biasing member includes a telescoping cover enclosing the spring and a locking mechanism that is configured to selectively and temporarily fix a length of the biasing member so that the cowl is temporarily restricted from moving about the joint axis, wherein the biasing member is enclosed within the aircraft nacelle assembly when the cowl is in the closed position, and wherein the aircraft nacelle assembly facilitates manual opening and closing of the cowl by an operator grasping and manipulating a region of the cowl that is distal to the joint axis.

15. The aircraft nacelle assembly of claim 14, wherein the joint axis is substantially horizontal when the aircraft nacelle assembly is in a predetermined position associated with maintenance of the engine.

16. The aircraft nacelle assembly of claim 14, wherein the biasing member does not utilize electric or hydraulic powered actuators.

17. The aircraft nacelle assembly of claim 14, wherein the biasing member is under compression during a full extent of movement of the cowl between the closed position and the open position.

18. The aircraft nacelle assembly of claim 14, wherein the aircraft nacelle assembly includes two or more biasing members, wherein each biasing member applies a substantially equal force to the cowl when the cowl is in the closed position, and wherein each biasing member applies a substantially equal force to the cowl when the cowl is in the open position.

19. The aircraft nacelle assembly of claim 14, wherein the rotatable joint is a hinge.

\* \* \* \* \*